US012763698B2

(12) United States Patent
(10) Patent No.: US 12,763,698 B2
(45) Date of Patent: Oct. 13, 2026
Liu et al.

(54) DISCONTINUOUS PULSE-WIDTH MODULATION METHOD

(71) Applicant: SHENZHEN VMAX NEW ENERGY (GROUP) CO., LTD, Shenzhen (CN)

(72) Inventors: Jun Liu, Shenzhen (CN); Jinzhu Xu, Shenzhen (CN); Rui Huang, Shenzhen (CN); Haibin Cao, Shenzhen (CN)

(73) Assignee: SHENZHEN VMAX NEW ENERGY (GROUP) CO., LTD, Shenzhen (CN)

( * ) Notice: Subject to any disclaimer, the term of this patent is extended or adjusted under 35 U.S.C. 154(b) by 215 days.

(21) Appl. No.: 18/806,854

(22) Filed: Aug. 16, 2024

(65) Prior Publication Data

US 2025/0350213 A1 Nov. 13, 2025

(30) Foreign Application Priority Data

May 10, 2024 (CN) ......................... 202410577524.0

(51) Int. Cl.
*H02M 7/219* (2006.01)
*H02M 1/00* (2007.01)
*H02M 1/12* (2006.01)

(52) U.S. Cl.
CPC ......... *H02M 7/219* (2013.01); *H02M 1/0012* (2021.05); *H02M 1/123* (2021.05)

(58) Field of Classification Search
CPC ..... H02M 1/0012; H02M 1/123; H02M 7/219
See application file for complete search history.

(56) References Cited

U.S. PATENT DOCUMENTS

2019/0028039 A1* 1/2019 Sodo ..................... H02M 1/126
2022/0216802 A1* 7/2022 Yan ....................... H02M 7/487
2024/0313627 A1* 9/2024 Mondal ............... H02M 1/0054

* cited by examiner

*Primary Examiner* — Jue Zhang
(74) *Attorney, Agent, or Firm* — Troutman Pepper Locke LLP; Tim Tingkang Xia, Esq.

(57) ABSTRACT

The present invention discloses a discontinuous pulse width modulation method, including: shifting an obtained first three-phase modulation wave upwards and downwards to obtain an upward-shifted three-phase modulation wave, a down-shifted three-phase modulation wave, an upward-shifted zero-sequence component and a down-shifted zero-sequence component; calculating a start time-point of a transition interval, a target zero-sequence component within a transition interval and an end time-point of a transition interval based on the above modulation wave and its zero-sequence component; adding the first three-phase modulation wave and the target zero-sequence component together to obtain a target three-phase modulation wave. The discontinuous pulse width modulation method of the present invention can slow down a modulation wave change within the transition interval, effectively abate the voltage and current oscillation of the common-mode suppressor unit and decrease the stress of the common-mode suppressor unit device.

10 Claims, 12 Drawing Sheets

DISCONTINUOUS PULSE-WIDTH MODULATION METHOD

CROSS REFERENCE TO RELATED APPLICATIONS

This application claims priority to and the benefit of Chinese Patent Application No. CN202410577524.0 filed in China on May 10, 2024. The disclosure of the above application is incorporated herein in its entirety by reference.

FIELD OF THE INVENTION

The present invention relates to the technical field of three-phase converters, in particular to a discontinuous pulse-width modulation method.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A three-phase converter is a power electronic device capable of achieving conversion between three-phase alternating current (AC) energy and direct current (DC) energy. As the power electronic device trends to operate in high frequency and high-power density, a metal housing and a multilayer PCB layout process are widely used, thus these processes enable a common-mode path to form between the power electronic device and the metal housing. The journal "Analysis and Improvement of the Effect of Distributed Parasitic Capacitance on High-Frequency High-Density Three-Phase Buck Rectifier", pointed out that common-mode interference shifts to an AC source through this path, thus affecting the quality on the AC-side current. Therefore, in the aspect of engineering, a common-mode suppressor circuit is used to reduce the common-mode interference, and FIG. 1 shows an existing three-phase converter topology with a common-mode suppressor circuit. The common-mode suppressor circuit is usually composed of capacitors, inductors, resistors and other components, and it is possible to suppress the common-mode interference and ensure normal operation of a system by way of reasonably designing a suppressor circuit structure and selecting parameters.

In order to effectively reduce losses and improve system efficiency during operation of three-phase converters, it is usual to adopt the discontinuous pulse width modulation (DPWM). However, when a traditional DPWM modulation strategy is adopted in the three-phase converter, occurrence of a step change in a modulation wave leads to a big common-mode voltage and current oscillation on a common-mode suppressor unit, making it unfavorable to choose components used in the suppressor unit. In addition, this common-mode voltage makes it necessary to isolate the sampling circuits on the AC and DC sides from each other by means of an isolation circuit, otherwise it will endanger hardware circuits in safety and stability. This common-mode current can be regarded as current circulating via an AC filter device, a switching device, and a common-mode suppressor circuit, so it is possible to resultantly aggravate the loss of the converter to a certain extent, and reduce the overall efficiency of the system.

The Chinese patent CN114337341A discloses a method and device of optimizing the farthest vector PWM for a two-level converter. In this patent, the proposed farthest vector PWM method is a carrier wave-based modulation method that optimizes the farthest vector by using a corresponding carrier wave in different reference spaces. The optimized maximum vector PWM method can reduce the amplitude and frequency of the common-mode voltage, and concurrently balance three-phase switching frequency and prevent three-phase simultaneous operation. In this solution, it is necessary to select specific carrier waves within different space angle regions, and it is cumbersome to complete the steps of the modulation strategy, in which there are a large number of judgment processes, so this solution has poor stability, making popularization and application in engineering unfavorable.

The Chinese Patent CN113765424A discloses a method and device of synchronously modulating carrier waves for a three-level inverter. In this patent, the frequency of the triangle carrier wave is set to 6 times the fundamental frequency, so as to obtain two sets of carrier waves different in phase position by 180°. In addition, it is possible to eliminate a multiple of three-order harmonic wave and an even-order harmonic wave in a line voltage by using a corresponding carrier wave and a modulation wave in a divided specific area, concurrently reduce the amplitude of the common-mode voltage by one-half and reduce the frequency of the common-mode voltage by two-thirds. In this solution, because it is necessary to select a specific initial modulation wave and carrier wave in different space angle regions, switching of the modulation wave will cause high-frequency noise interference, affecting normal operation of other electronic devices.

FIG. 3 shows four existing DPWM modulation strategies, in which a step change each occurs to a modulation wave. As a result, oscillation of common-mode voltage and common-mode current all occurs to the modulation strategies in FIG. 3 (FIG. 3*a*, FIG. 3*b*, FIG. 3*c* and FIG. 3*d*). In summary, there are many ways to provide common-mode suppression, but the common problem is that: a big voltage and current of the common-mode suppressor unit during adopting the DPWM modulation strategy influences accuracy of sampling signals of a sampling circuit, and error or interference in the sampling circuit makes it more difficult to choose the common-mode suppressor unit, further increasing the cost of the system; in addition, makes loss of converters more severe, increasing the power consumption of the system, and lowering the overall efficiency of the system.

SUMMARY OF THE INVENTION

In order to solve the above-mentioned defects existing in the prior art, the invention proposes a discontinuous pulse-width modulation method.

The technical scheme adopted in the present invention is to design a discontinuous pulse width modulation method applied to a three-phase converter, comprising the steps of: shifting an obtained first three-phase modulation wave upwards to obtain an upward-shifted three-phase modulation wave, and shifting the first three-phase modulation wave downwards to obtain a down-shifted three-phase modulation wave; obtaining an upward-shifted zero-sequence component based on the upward-shifted three-phase modulation wave, and obtaining a down-shifted zero-sequence component based on the down-shifted three-phase modulation wave; obtaining a start time-point of a transition interval based on the upward-shifted zero-sequence component and the down-shifted zero-sequence component; obtaining a target zero-sequence component within the transition interval based on an obtained first zero-sequence component, the start time-point and a time-point of sign switching occurring to the first zero-sequence component; obtaining an end time-point of the transition interval based on the first zero-sequence component, the target zero-sequence component within the transition interval and a preset difference threshold; the transition interval being an interval between the start time-point of the transition interval and the end time-point of the transition interval; the start time-point of the transition interval being prior to the end time-point of the transition interval; and adding the first three-phase modulation wave and the target zero-sequence component together to obtain a target three-phase modulation wave, and the target zero-sequence component within a non-transition interval being the first zero-sequence component.

Preferably, the step of obtaining a start time-point of a transition interval based on the upward-shifted zero-sequence component and the down-shifted zero-sequence component includes: starting the transition interval once it is judged that the upward-shifted zero-sequence component is bigger than 0 and the down-shifted zero-sequence component is smaller than 0.

Preferably, the condition of starting the transition interval is as follows, $$(D_{zd(\alpha)} < 0) \,\&\, (D_{zr(\alpha)} > 0)$$

where, $D_{zr(\alpha)}$ represents a real-time value of the upward-shifted zero-sequence component, $D_{zd(\alpha)}$ represents a real-time value of the down-shifted zero-sequence component.

Preferably, the step of obtaining a target zero-sequence component within the transition interval based on an obtained first zero-sequence component, the start time-point and a time-point of sign switching occurring to the first zero-sequence component includes:

$$D_0 = \begin{cases} \dfrac{-D_{z0(trs1)}}{D_{z0(trs2)} - D_{z0(trs1)}} D_{z0(\alpha)} + \dfrac{D_{z0(\alpha)}}{|D_{z0(\alpha)}|} * \dfrac{D_{z0(trs2)} * D_{z0(trs1)}}{D_{z0(trs2)} - D_{z0(trs1)}} & \text{(transition interval)} \\ D_{z0(\alpha)} & \text{(non-transition interval)} \end{cases}$$

where, $D_0$ represents the target zero-sequence component, $D_{z0(trs1)}$ represents a value of the first zero-sequence component at the beginning of the transition interval, $D_{z0(trs2)}$ represents a value of the first zero-sequence component at a time-point prior to its sign switching position, $D_{z0(\alpha)}$ represents a real-time value of the first zero-sequence component.

Preferably, the step of obtaining an end time-point of the transition interval based on the first zero-sequence component, the target zero-sequence component within the transition interval and a preset difference threshold includes: calculating out a difference value of zero-sequence components between the first zero-sequence component and the target zero-sequence component within the transition interval; ending the transition interval in the case that an absolute value of the difference value of zero-sequence components is smaller than or equal to the preset difference threshold.

Preferably, the condition of the end time-point of the transition interval is as follows, $$|D_{0(\alpha)} - D_{z0(\alpha)}| \le x$$

where, $D_{0(\alpha)}$ represents a real-time value of the target zero-sequence component, $D_{z0\,(\alpha)}$ represents a real-time value of the first zero-sequence component, x represents the preset difference threshold.

Preferably, the first three-phase modulation wave is denoted by the following formulas, $$\begin{cases} D_{a0} = b + m\sin\alpha \\ D_{b0} = b + m\sin(\alpha - 2\pi/3) \\ D_{c0} = b + m\sin(\alpha + 2\pi/3) \end{cases}$$

where, $D_{a0}$ presents the first phase modulation wave of the first three-phase modulation wave, $D_{b0}$ presents the second phase modulation wave of the first three-phase modulation wave, $D_{c0}$ presents the third phase modulation wave of the first three-phase modulation wave, b represents a DC offset, m represents a modulation degree, $\alpha=\omega t$, $\omega$ represents a three-phase AC angular frequency.

Preferably, the first zero sequence component is denoted by the following formula, $$D_{z0} = \begin{cases} 0.5 + b - D_{0max} & (|D_{0max}| \ge |D_{0min}|) \\ -0.5 + b - D_{0min} & (|D_{0max}| < |D_{0min}|) \end{cases}$$

where, $D_{z0}$ represents the first zero-sequence component, b represents a DC offset, $D_{0max}$ represents the maximum value of the first phase modulation wave, the second phase modulation wave and the third phase modulation wave in the first three-phase modulation wave, $D_{0min}$ represents the minimum value of the first phase modulation wave, the second phase modulation wave and the third phase modulation wave in the first three-phase modulation wave.

Preferably, the upward-shifted three-phase modulation wave is denoted by the following formulas, $$\begin{cases} D_{ar} = D_{a0} + h \\ D_{br} = D_{b0} + h \\ D_{cr} = D_{c0} + h \end{cases}$$

where, $D_{ar}$ presents the first phase upward-shifted modulation wave of the upward-shifted three-phase modulation wave, $D_{br}$ presents the second phase upward-shifted modulation wave of the upward-shifted three-phase modulation wave, $D_{cr}$ presents the third phase upward-shifted modulation wave of the upward-shifted three-phase modulation wave, $D_{a0}$ presents the first phase modulation wave of the first three-phase modulation wave, $D_{b0}$ presents the second phase modulation wave of the first three-phase modulation wave, $D_{c0}$ presents the third phase modulation wave of the first three-phase modulation wave, h represents an offset;

the upward-shifted zero-sequence component is denoted by the following formula, $$D_{zr} = \begin{cases} 0.5 + b - D_{rmax} & (|D_{rmax}| \geq |D_{rmin}|) \\ -0.5 + b - D_{rmin} & (|D_{rmax}| < |D_{rmin}|) \end{cases}$$

where, b represents a DC offset, $D_{rmax}$ represents the maximum value of the first phase modulation wave, the second phase modulation wave and the third phase modulation wave in the upward-shifted three-phase modulation wave, $D_{rmin}$ represents the minimum value of the first phase modulation wave, the second phase modulation wave and the third phase modulation wave in the upward-shifted three-phase modulation wave.

Preferably, the down-shifted three-phase modulation wave is denoted by the following formulas, $$\begin{cases} D_{ad} = D_{a0} - h \\ D_{bd} = D_{b0} - h \\ D_{cd} = D_{c0} - h \end{cases}$$

where, $D_{ad}$ presents the first phase down-shifted modulation wave of the down-shifted three-phase modulation wave, $D_{bd}$ presents the second phase down-shifted modulation wave of the down-shifted three-phase modulation wave, $D_{cd}$ presents the third phase down-shifted modulation wave of the down-shifted three-phase modulation wave, $D_{a0}$ presents the first phase modulation wave of the first three-phase modulation wave, $D_{b0}$ presents the second phase modulation wave of the first three-phase modulation wave, $D_{c0}$ presents the third phase modulation wave of the first three-phase modulation wave, h represents an offset;

the down-shifted zero-sequence component is denoted by the following formula, $$D_{zd} = \begin{cases} 0.5 + b - D_{dmax} & (|D_{dmax}| \geq |D_{dmin}|) \\ -0.5 + b - D_{dmin} & (|D_{dmax}| < |D_{dmin}|) \end{cases}$$

where, b represents a DC offset, $D_{dmax}$ represents the maximum value of the first phase modulation wave, the second phase modulation wave and the third phase modulation wave in the down-shifted three-phase modulation wave, $D_{dmin}$ represents the minimum value of the first phase modulation wave, the second phase modulation wave and the third phase modulation wave in the down-shifted three-phase modulation wave.

The beneficial effects of the technical scheme provided by the present invention are:

In the present invention, by way of defining the transition interval and setting the target zero-sequence component in the non-transition interval as the first zero-sequence component, the target first zero-sequence component within the transition interval is calculated out based on the first zero-sequence component, the start time-point of the transition interval and the time-point of sign switching occurring to the first zero-sequence component, thus it is possible to slow down the change rate of the modulation wave within the transition interval, effectively abate the voltage and current oscillation of the common-mode suppressor unit and decrease the stress of the common-mode suppressor unit device; in addition, it is possible to directly calculate out the target zero-sequence component of the transition interval based on a simple and accessible calculation formula. A decrease in the common-mode current further reduces the current of the power element in the three-phase converter, thus abating the loss of the three-phase converter and improving the efficiency of the three-phase converter.

BRIEF DESCRIPTION OF THE DRAWINGS

We shall further describe the present invention in detail in combination with the examples and drawings as follows.

DETAILED DESCRIPTION OF SOME EMBODIMENTS

In order to make the objectives, technical solutions, and advantages of the invention clearer, the invention is further described in detail with reference to the drawings and the embodiments as follows. It should be understood that the specific embodiments described here are only used to explain the invention, but not used to limit the invention.

It should be noted that the words such as first, second and third in the inventions are only used to distinguish and have no other special meanings without intention of imposing any limitation on the present invention.

The present invention is to solve the common defect in the traditional DPWM modulation strategy: a step change occurs to the modulation wave, so as to cause a big voltage and current oscillation on the common-mode suppressor unit, making it unfavorable to choose the common-mode suppressor unit, and influencing design of a sampling circuit and increasing hardware costs; in addition, the big common-mode current causes an increase in the power loss of the converter and a decrease in the efficiency of the converter. The present invention can effectively abate the voltage and current oscillation of the common-mode suppressor unit and decrease the stress of the common-mode suppressor unit device by introducing a transition interval and slowing down a change rate of a modulation wave.

The three-phase converter in the present invention includes a three-phase AC/DC converter and a three-phase DC/AC converter.

Figure 1:
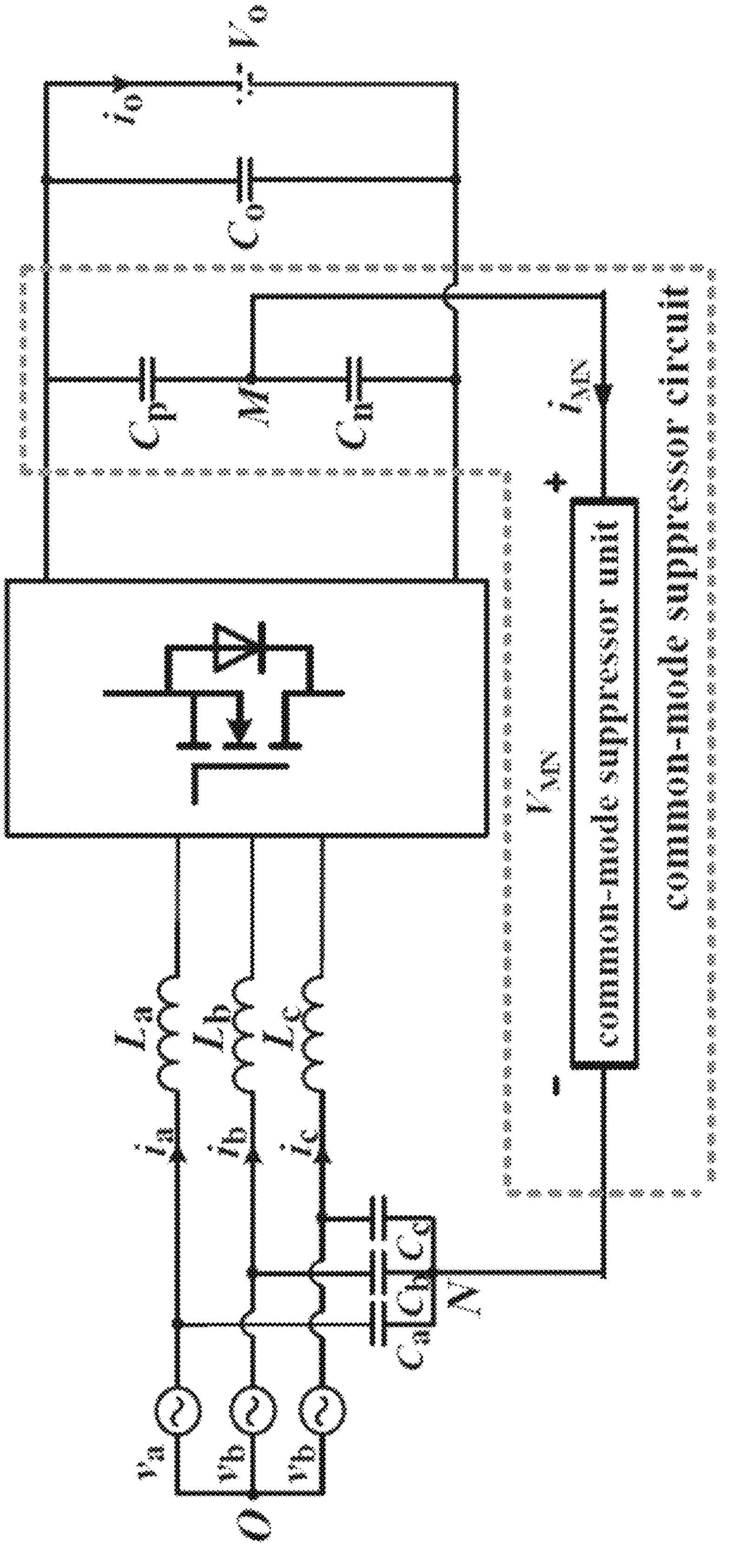
FIG. 1 is a simplified topology diagram of a three-phase converter with a common-mode suppressor circuit.
Figure 2:
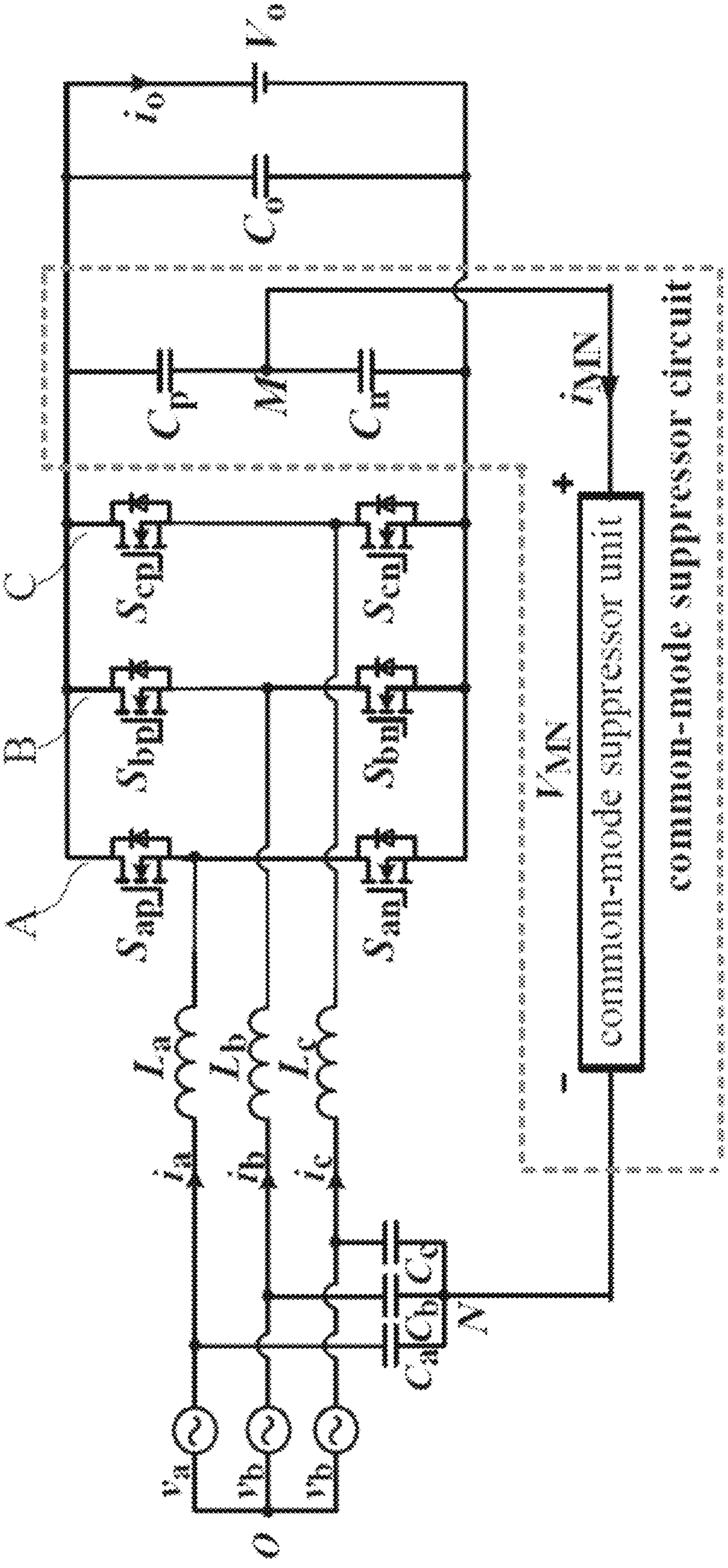
FIG. 2 shows a topology of a three-phase voltage source rectifier with a common-mode suppressor circuit.
Figure 3A:
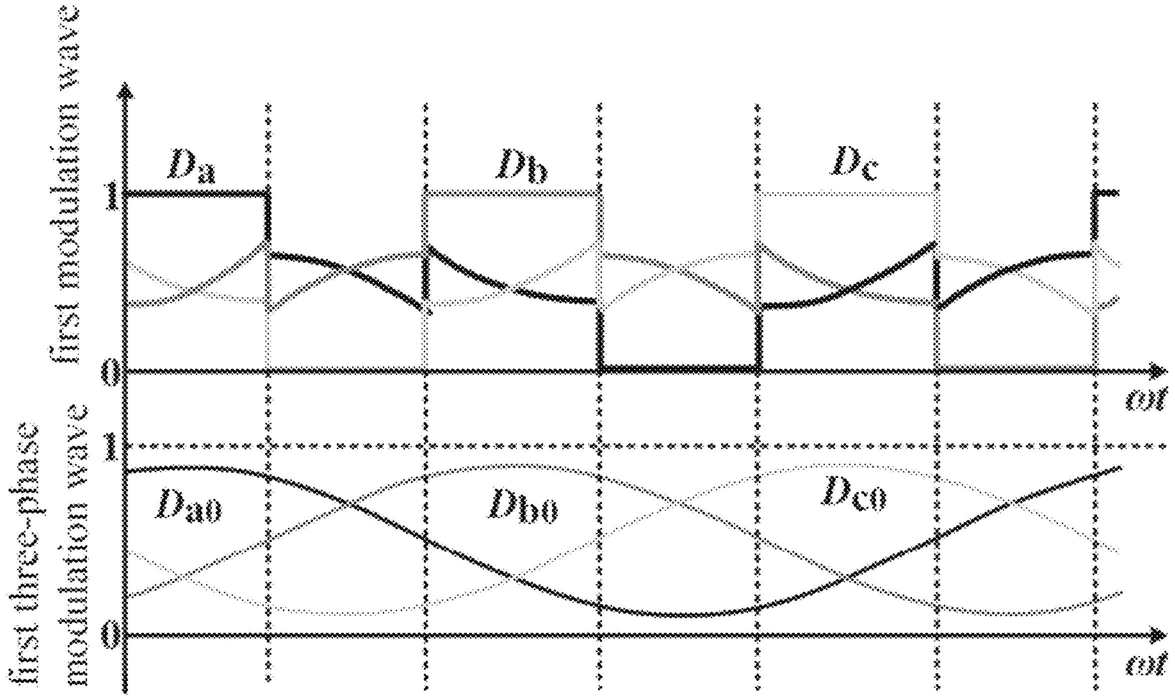
FIG. 3*a* is a schematic diagram of the modulation wave for the first existing DPWM modulation strategy.
Figure 3B:
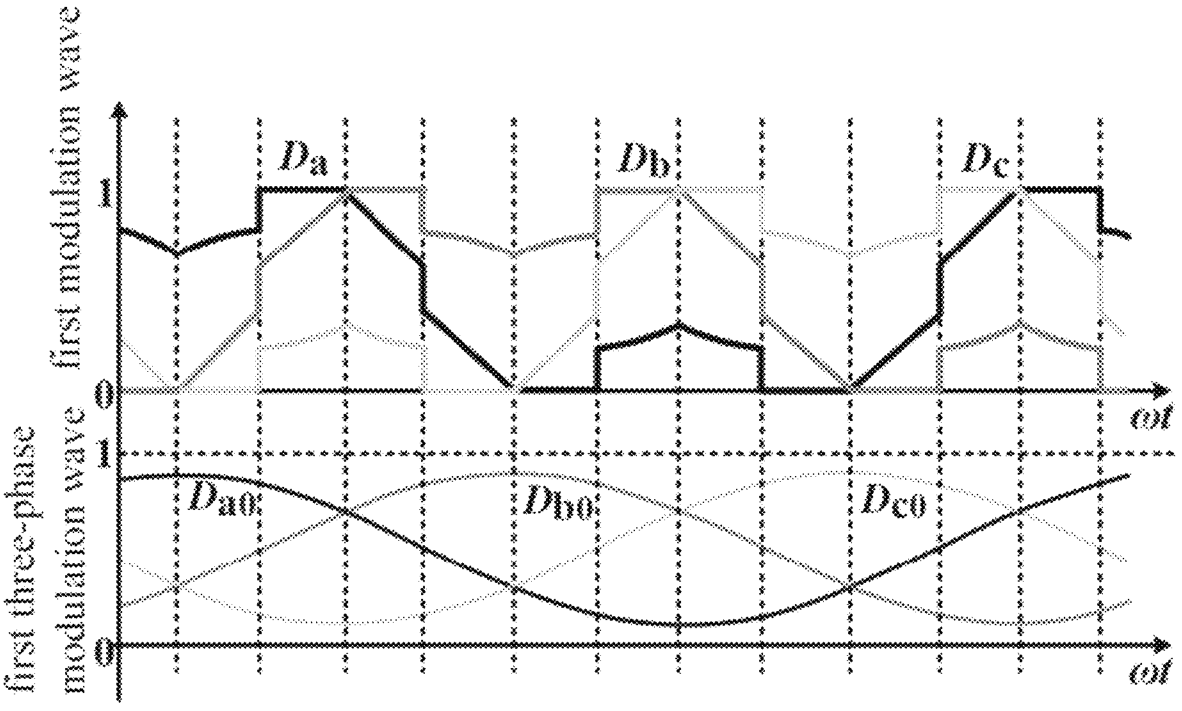
FIG. 3*b* is a schematic diagram of the modulation wave for the second existing DPWM modulation strategy.
Figure 3C:
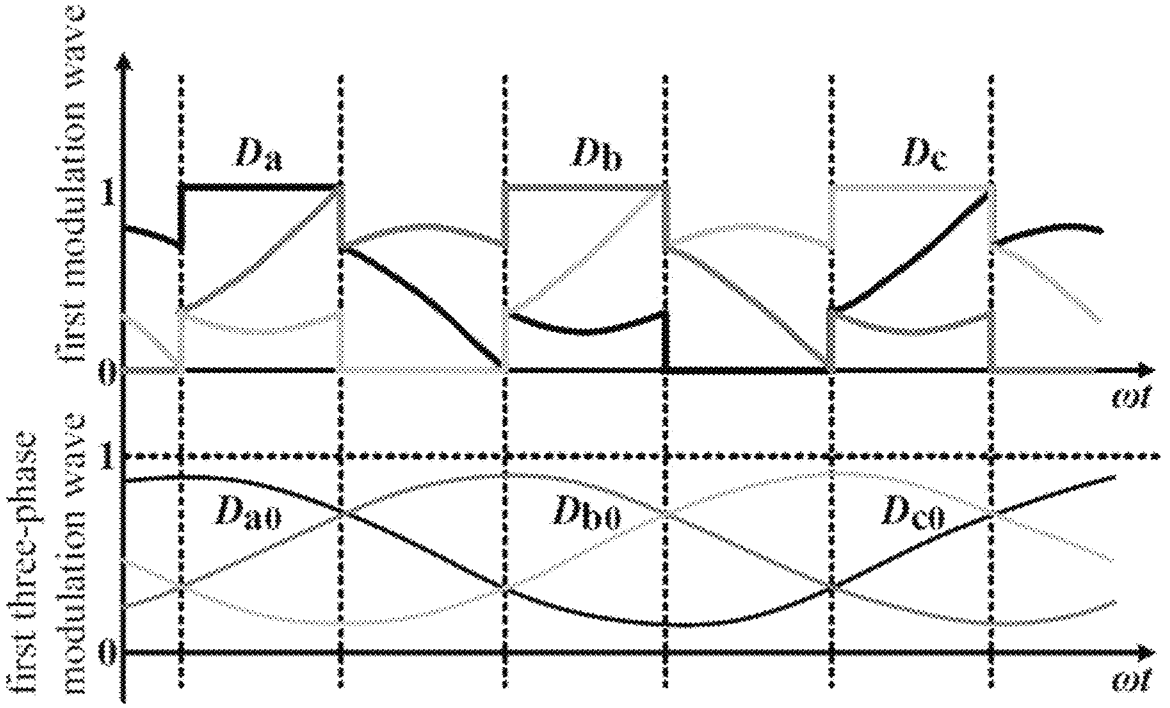
FIG. 3*c* is a schematic diagram of the modulation wave for the third existing DPWM modulation strategy.
Figure 3D:
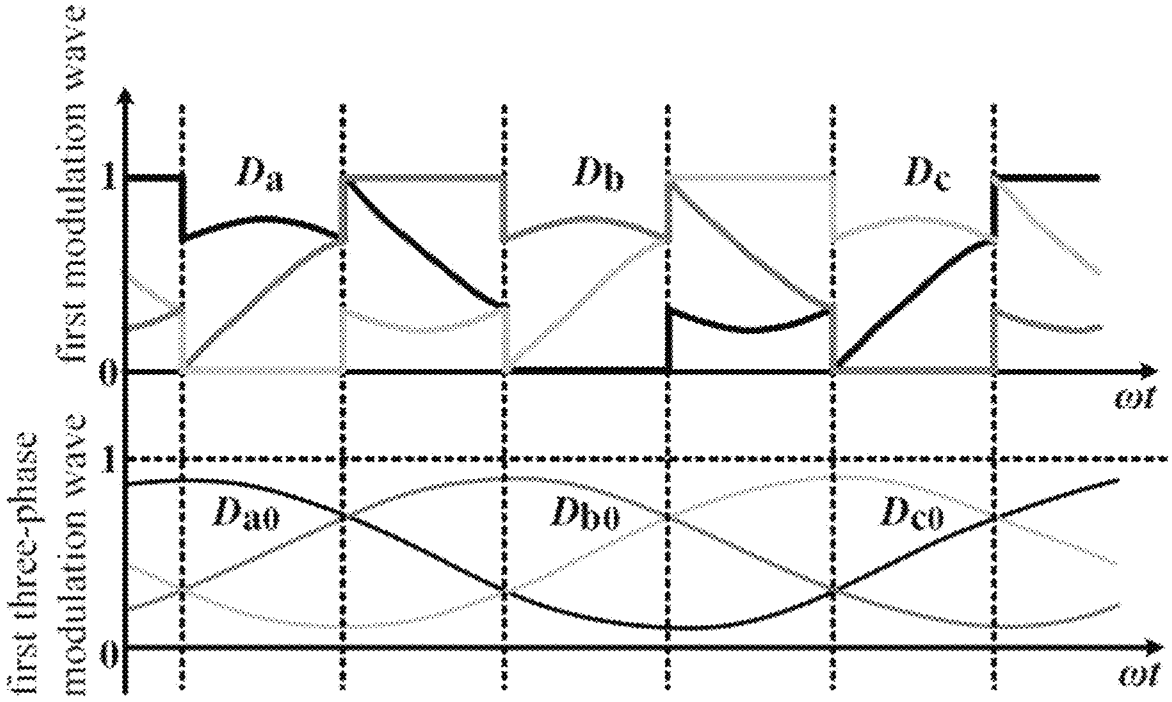
FIG. 3*d* is a schematic diagram of the modulation wave for the fourth existing DPWM modulation strategy.

The discontinuous pulse-width modulation method disclosed in the present invention is applied to such a three-phase converter as the three-phase voltage source rectifier shown in FIG. 2. The three-phase converter includes a three-phase AC ($v_a$, $v_b$, $v_c$) circuit, and three capacitors ($C_a$, $C_b$, $C_c$) connected in parallel with the three-phase AC circuit. One end of each of the three capacitors is connected to one phase of the three-phase AC circuit, and the other end is connected to a common terminal N. The common terminal N is connected to a common-mode suppressor circuit, and the connection points between the three-phase AC circuit and the three capacitors are respectively connected to a first leg unit A, a second leg unit B and a third leg unit C via three inductors ($L_a$, $L_b$, $L_c$). The first leg unit includes a first switch tube $S_{ap}$ and a second switch tube $S_{an}$, the second leg unit includes a third switch tube $S_{bp}$ and a fourth switch tube $S_{bn}$, and the third leg unit includes a fifth switch tube $S_{cp}$ and a sixth switch tube $S_{cn}$. The common-mode suppressor circuit includes a common-mode suppressor unit, a first capacitor $C_p$ and a second capacitor $C_n$, and the first capacitor $C_p$ and the second capacitor $C_n$ are arranged between the third leg unit and a filter capacitor $C_o$. The common-mode suppressor unit is connected in series between the connection point M of the first capacitor $C_p$ with the second capacitor $C_n$ and the common terminal N. The common-mode suppressor unit may be composed of components such as capacitors, inductors, resistors, or even a conducting wire. The A phase of the three-phase AC circuit is connected to the midpoint of the first leg unit via the inductor $L_a$, the B phase is connected to the midpoint M of the second leg unit via the inductor $L_b$, and the C phase is connected to the midpoint of the third leg unit via the inductor $L_c$; the midpoint M of the first capacitor $C_p$ and the second capacitor $C_n$ is connected to the common terminal N of the three-phase AC-side filter capacitor via the common-mode suppressor unit.

Figure 4:
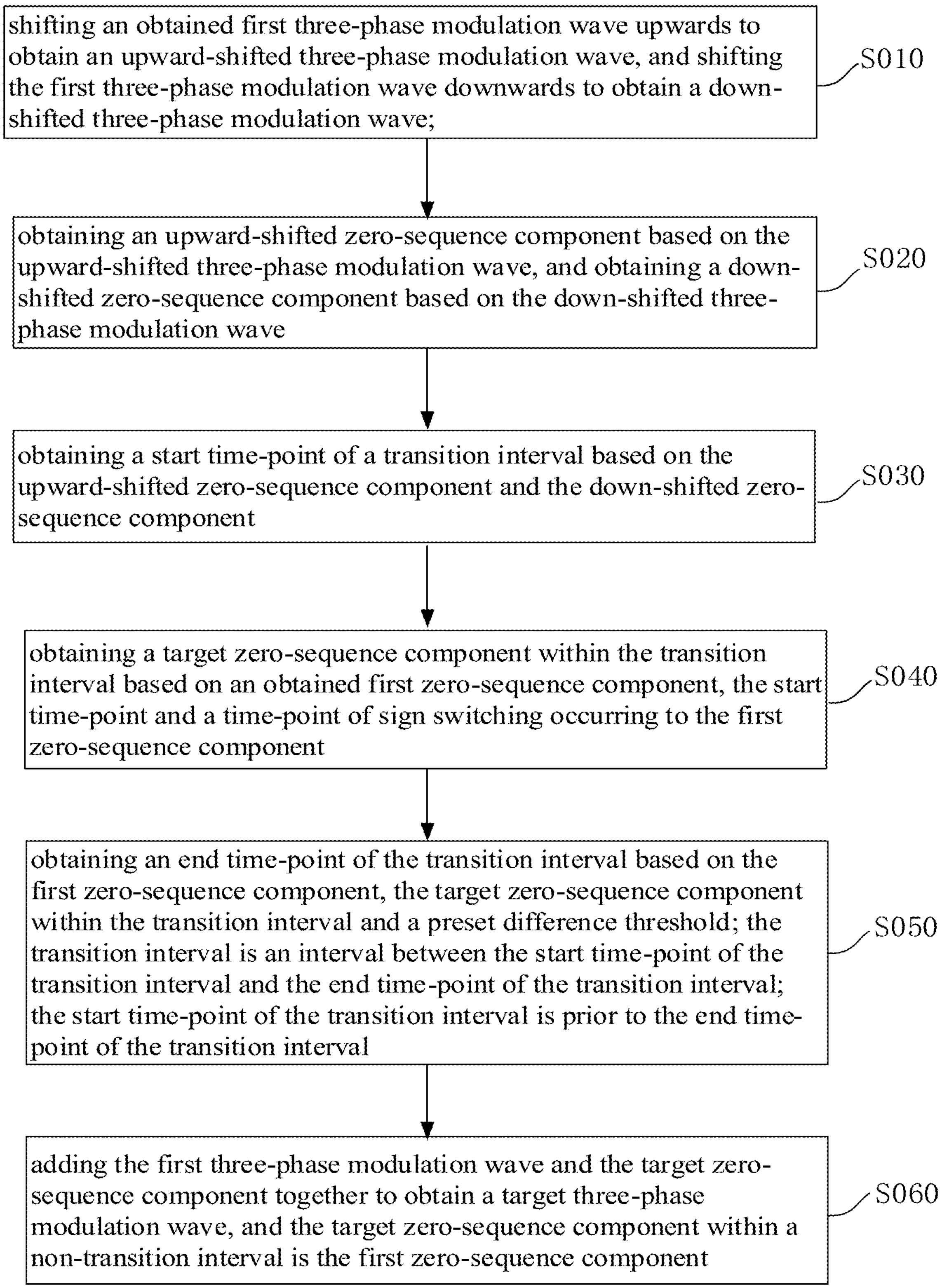
FIG. 4 is a flowchart of the discontinuous pulse-width modulation method according to the present invention.

The present invention discloses a discontinuous pulse width modulation method applied to a three-phase converter, with reference to the flowchart of the discontinuous pulse-width modulation method according to the present invention shown in FIG. 4, the method includes the steps of

- S010, shifting an obtained first three-phase modulation wave upwards to obtain an upward-shifted three-phase modulation wave, and shifting the first three-phase modulation wave downwards to obtain a down-shifted three-phase modulation wave;
- S020, obtaining an upward-shifted zero-sequence component based on the upward-shifted three-phase modulation wave, and obtaining a down-shifted zero-sequence component based on the down-shifted three-phase modulation wave;
- S030, obtaining a start time-point of a transition interval based on the upward-shifted zero-sequence component and the down-shifted zero-sequence component;
- S040, obtaining a target zero-sequence component within the transition interval based on an obtained first zero-sequence component, the start time-point and a time-point of sign switching occurring to the first zero-sequence component;
- S050, obtaining an end time-point of the transition interval based on the first zero-sequence component, the target zero-sequence component within the transition interval and a preset difference threshold; the transition interval being an interval between the start time-point of the transition interval and the end time-point of the transition interval; the start time-point of the transition interval being prior to the end time-point of the transition interval; and
- S060, adding the first three-phase modulation wave and the target zero-sequence component together to obtain a target three-phase modulation wave, and the target zero-sequence component within a non-transition interval being the first zero-sequence component.

It should be pointed out that the sign switching means that the numerical value of the zero-sequence component is switched between a positive sign and a negative sign, that is, the time-point of the sign switching refers to a time-point when the numerical value of the zero-sequence component is switched from a negative sign to a positive sign, or from a positive sign to a negative sign. The discontinuous pulse-width modulation method disclosed in the present invention can be applied to a three-phase converter, and the three-phase AC circuit is an AC source externally connected to the three-phase converter.

In the present invention, the target three-phase modulation wave is derived through the aforementioned discontinuous pulse-width modulation method, and the target three-phase modulation wave and the carrier wave are modulated with each other to generate a driving signal that controls switching of power in the three-phase converter.

In the present invention, by way of defining the transition interval and setting the target zero-sequence component in the non-transition interval as the first zero-sequence component, the target first zero-sequence component within the transition interval is calculated out based on the first zero-sequence component, the start time-point of the transition interval and the time-point of sign switching occurring to the first zero-sequence component, thus it is possible to slow down the change rate of the modulation wave within the transition interval, effectively abate the voltage and current oscillation of the common-mode suppressor unit and decrease the stress of the common-mode suppressor unit device; in addition, it is possible to directly calculate out the target zero-sequence component of the transition interval based on a simple and accessible calculation formula. A decrease in the common-mode current further reduces the current of the power element in the three-phase converter, thus abating the loss of the three-phase converter and improving the efficiency of the three-phase converter.

In an example, the step of obtaining a start time-point of a transition interval based on the upward-shifted zero-sequence component and the down-shifted zero-sequence component includes: starting the transition interval once it is judged that the upward-shifted zero-sequence component is bigger than 0 and the down-shifted zero-sequence component is smaller than 0.

Preferably, the zero-sequence component sampled at current time is taken as a real-time value of the zero-sequence component, and a real-time value of the upward-shifted zero-sequence component is denoted by $D_{zr(\alpha)}$, a real-time value of the down-shifted zero-sequence component is denoted by $D_{zd(\alpha)}$, and a real-time value of the first zero-sequence component is denoted by $D_{z0(\alpha)}$. The start time-point of the transition interval is determined according to the sign switching position of the upward-shifted zero-sequence component and the down-shifted zero-sequence component, and the three-phase modulation wave enters the transition interval when the two components accord with the following formula. The condition of starting the transition interval is as follows.

$$(D_{zd(\alpha)} < 0)\,\&(D_{zr(\alpha)} > 0);$$

Where, $D_{zr(\alpha)}$ represents a real-time value of the upward-shifted zero-sequence component, $D_{zd(\alpha)}$ represents a real-time value of the down-shifted zero-sequence component.

In an example, the step of obtaining the target zero-sequence component within the transition interval based on the first zero-sequence component, the start time-point and the time-point of sign switching occurring to the first zero-sequence component includes:

recording a value of the first zero-sequence component at the beginning of the transition interval as $D_{z0(trs1)}$, and calculating out a value of the first zero-sequence component at the time-point prior to its sign switching position according to a current modulation degree m, denoted by $D_{z0(trs2)}$, thus determining the target zero-sequence component $D_0$ in accordance with the following formular.

$$D_0 = \begin{cases} \dfrac{-D_{z0(trs1)}}{D_{z0(trs2)} - D_{z0(trs1)}} D_{z0(\alpha)} + \dfrac{D_{z0(\alpha)}}{|D_{z0(\alpha)}|} * \dfrac{D_{z0(trs2)} * D_{z0(trs1)}}{D_{z0(trs2)} - D_{z0(trs1)}} & \text{(transition interval)} \\ D_{z0(\alpha)} & \text{(non-transition interval)} \end{cases}$$

Where, $D_0$ represents the target zero-sequence component, $D_{z0(trs1)}$ represents a value of the first zero-sequence component at the beginning of the transition interval, $D_{z0(trs2)}$ represents a value of the first zero-sequence component at a time-point prior to its sign switching position, $D_{z0(\alpha)}$ represents a real-time value of the first zero-sequence component.

In an example, the step of obtaining an end time-point of the transition interval based on the first zero-sequence component, the target zero-sequence component within the transition interval and a preset difference threshold includes:

calculating out a difference value of zero-sequence components between the first zero-sequence component and the target zero-sequence component within the transition interval; ending the transition interval in the case that an absolute value of the difference value of zero-sequence components is smaller than or equal to the preset difference threshold.

Preferably, a real-time value of the target zero-sequence component $D_0$ is denoted by $D_{0(\alpha)}$, and an end time-point of the transition interval is judged according to the difference between the real-time value of the target zero-sequence component $D_{0(\alpha)}$ and the real-time value of the first zero-sequence component $D_{z0(\alpha)}$. The condition of the end time-point of the transition interval is as follows.

$$|D_{0(\alpha)} - D_{z0(\alpha)}| \le x;$$

Where, $D_{0(\alpha)}$ represents a real-time value of the target zero-sequence component, $D_{z0\,(\alpha)}$ represents a real-time value of the first zero-sequence component, x represents the preset difference threshold.

Figure 6:
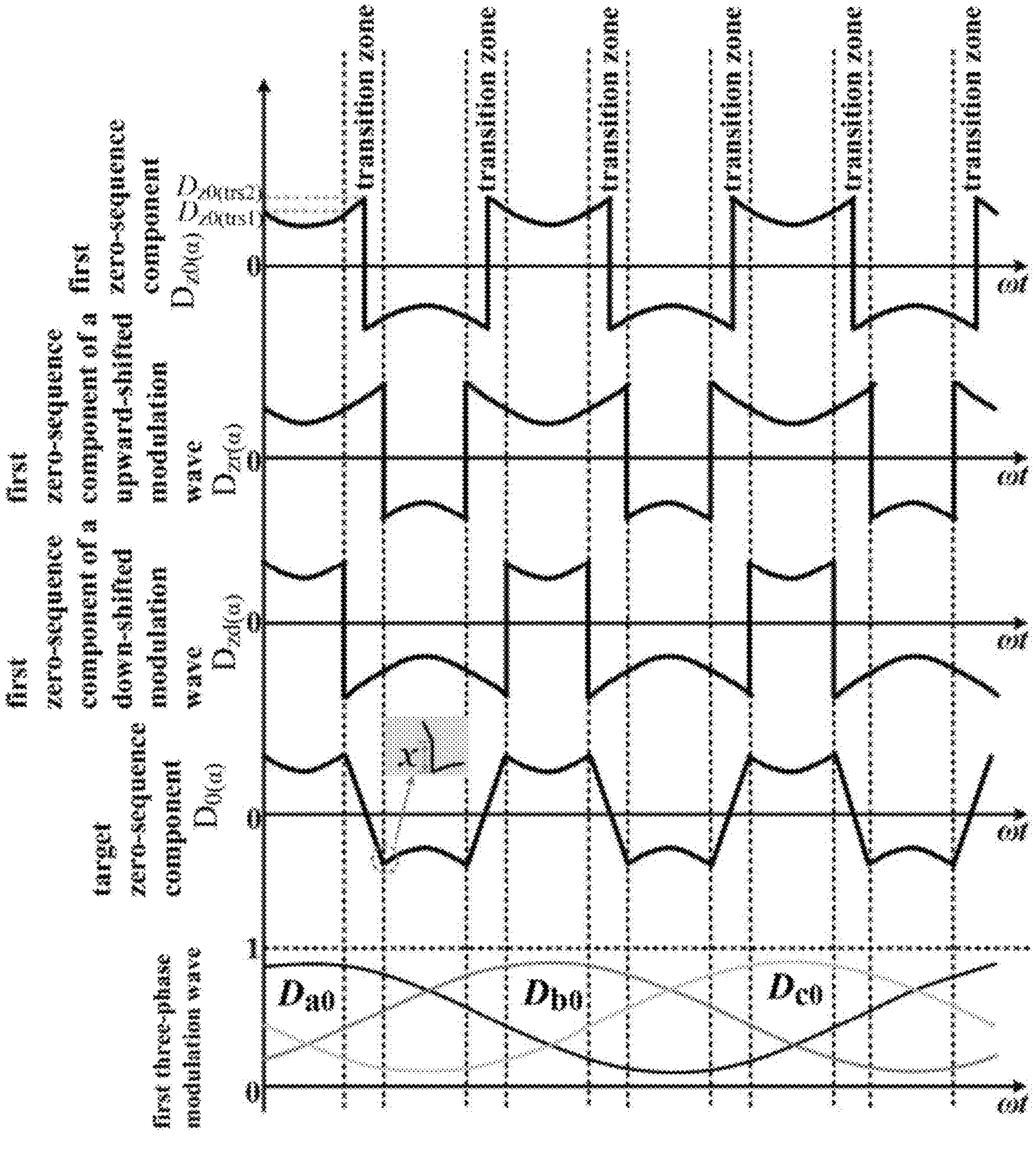
FIG. 6 is a schematic diagram showing the division of the transition interval in the present invention.

It should be pointed out that the smaller the value of x, the more smoothly the transition interval of the three-phase modulation wave is switched to a sector, therefore, the value of x(0<x≤0.5) is to be the minimum limit value that a controller can judge, not intended to be specifically limited in the present invention. Based on the start and end time-points of the transition interval given above, FIG. 6 shows how to specifically divide the transition interval.

In an example, the three-phase modulation wave can be obtained by normalizing a sampled three-phase AC voltage. The first three-phase modulation wave is denoted by the following formulas.

$$\begin{cases} D_{a0} = b + m\sin\alpha \\ D_{b0} = b + m\sin(\alpha - 2\pi/3) \\ D_{c0} = b + m\sin(\alpha + 2\pi/3) \end{cases};$$

Where, $D_{a0}$ presents the first phase modulation wave of the first three-phase modulation wave, $D_{b0}$ presents the second phase modulation wave of the first three-phase modulation wave, $D_{c0}$ presents the third phase modulation wave of the first three-phase modulation wave, b represents a DC offset, m represents a modulation degree, α=ωt, ω represents a three-phase AC angular frequency. In a preferred embodiment, the value range of m is 0≤m≤0.5.

Figure 5A:
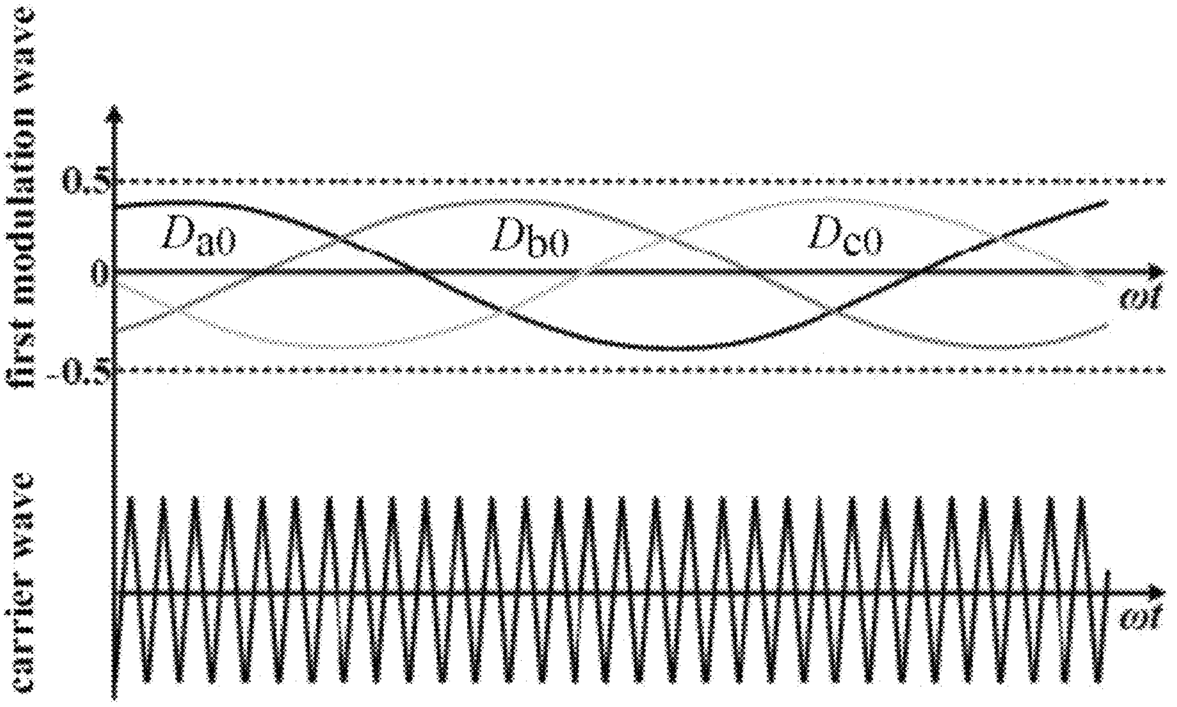
FIG. 5*a* is a schematic diagram of the modulation strategy corresponding to a bipolar carrier waver.
Figure 5B:
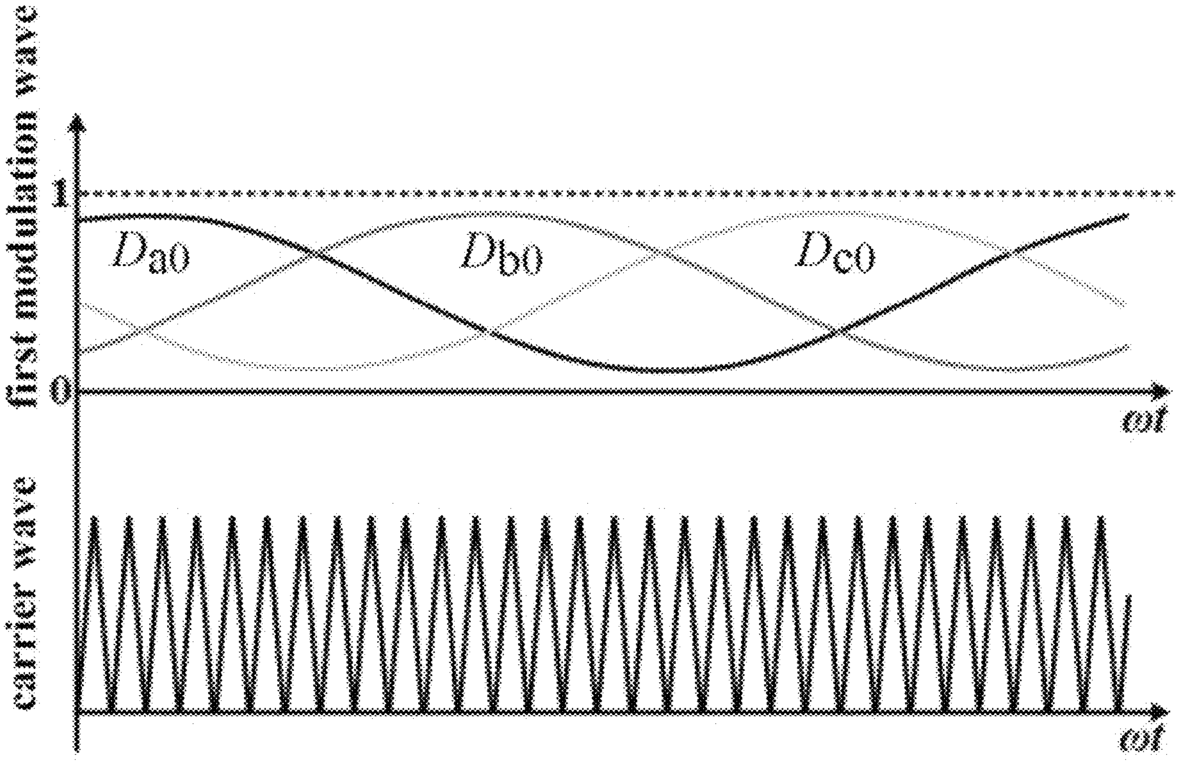
FIG. 5*b* is a schematic diagram of the modulation strategy corresponding to a unipolar carrier waver.

The target three-phase modulation wave needs to be modulated with the carrier wave, which is mainly divided into a unipolar carrier wave and a bipolar carrier wave, referring to the schematic diagram of the modulation strategy corresponding to a bipolar carrier waver shown in FIG. 5*a*, and the schematic diagram of the modulation strategy corresponding to a unipolar carrier waver shown in FIG. 5*b*, the waveform of the bipolar carrier lies on both sides of the zero axis, and the waveform of the unipolar carrier lies on the upper side of the zero axis. Considering that the target three-phase modulated wave (Da, Db, Dc) is modulated with the carrier wave having two polarities, the DC offset b is introduced into the formula for calculating the first three-phase modulated wave. When the carrier wave is bipolar, the value of b is 0, and when the carrier wave is unipolar, the value of b is 0.5.

In an example, the first zero-sequence component $D_{z0}$ is calculated out based on the first three-phase modulation wave. The first zero sequence component is denoted by the following formula.

$$D_{z0} = \begin{cases} 0.5 + b - D_{0max} & (|D_{0max}| \ge |D_{0min}|) \\ -0.5 + b - D_{0min} & (|D_{0max}| < |D_{0min}|) \end{cases};$$

Where, $D_{z0}$ represents the first zero-sequence component, b represents the DC offset, $D_{0max}$ represents the maximum value of the first phase modulation wave, the second phase modulation wave and the third phase modulation wave in the first three-phase modulation wave, $D_{0min}$ represents the minimum value of the first phase modulation wave, the second phase modulation wave and the third phase modulation wave in the first three-phase modulation wave.

In an embodiment thereof, the first three-phase modulation wave is added with an offset h to obtain the upward-shifted three-phase modulation wave ($D_{ar}$, $D_{br}$, $D_{cr}$), the upward-shifted three-phase modulation wave is denoted by the following formulas.

$$\begin{cases} D_{ar} = D_{a0} + h \\ D_{br} = D_{b0} + h \\ D_{cr} = D_{c0} + h \end{cases};$$

Where, $D_{ar}$ presents the first phase upward-shifted modulation wave of the upward-shifted three-phase modulation wave, $D_{br}$ presents the second phase upward-shifted modulation wave of the upward-shifted three-phase modulation wave, $D_{cr}$ presents the third phase upward-shifted modulation wave of the upward-shifted three-phase modulation wave, $D_{a0}$ presents the first phase modulation wave of the first three-phase modulation wave, $D_{b0}$ presents the second phase modulation wave of the first three-phase modulation wave, $D_{c0}$ presents the third phase modulation wave of the first three-phase modulation wave, h represents the offset, the value range of h is $0 \le h \le 0.5-m$.

In an example, based on the upward-shifted three-phase modulation wave ($D_{ar}$, $D_{br}$, $D_{cr}$), the upward-shifted zero-sequence component $D_{zr}$ is obtained, and the upward-shifted zero-sequence component is denoted by the following formula.

$$D_{zr} = \begin{cases} 0.5 + b - D_{rmax} & (|D_{rmax}| \ge |D_{rmin}|) \\ -0.5 + b - D_{rmin} & (|D_{rmax}| < |D_{rmin}|) \end{cases};$$

Where, b represents the DC offset, $D_{rmax}$ represents the maximum value of the first phase modulation wave $D_{ar}$, the second phase modulation wave $D_{br}$ and the third phase modulation wave $D_{cr}$ in the upward-shifted three-phase modulation wave, $D_{rmin}$ represents the minimum value of the first phase modulation wave $D_{ar}$, the second phase modulation wave $D_{br}$ and the third phase modulation wave $D_{cr}$ in the upward-shifted three-phase modulation wave.

An offset h is subtracted from the first three-phase modulation wave to obtain the down-shifted three-phase modulation wave ($D_{ad}$, $D_{bd}$, $D_{cd}$), and the down-shifted three-phase modulation wave is denoted by the following formulas.

$$\begin{cases} D_{ad} = D_{a0} - h \\ D_{bd} = D_{b0} - h \\ D_{cd} = D_{c0} - h \end{cases}$$

Where, $D_{ad}$ presents the first phase down-shifted modulation wave of the down-shifted three-phase modulation wave, $D_{bd}$ presents the second phase down-shifted modulation wave of the down-shifted three-phase modulation wave, $D_{cd}$ presents the third phase down-shifted modulation wave of the down-shifted three-phase modulation wave, $D_{a0}$ presents the first phase modulation wave of the first three-phase modulation wave, $D_{b0}$ presents the second phase modulation wave of the first three-phase modulation wave, $D_{c0}$ presents the third phase modulation wave of the first three-phase modulation wave, h represents the offset, preferably, the value range of h is $0 \le h \le 0.5-m$.

Based on the down-shifted three-phase modulation wave ($D_{ad}$, $D_{bd}$, $D_{cd}$), the down-shifted zero-sequence component $D_{zd}$ is obtained, and the down-shifted zero-sequence component is denoted by the following formula.

$$D_{zd} = \begin{cases} 0.5 + b - D_{dmax} & (|D_{dmax}| \ge |D_{dmax}|) \\ -0.5 + b - D_{dmax} & (|D_{dmax}| < |D_{dmax}|) \end{cases}$$

Where, b represents the DC offset, $D_{dmax}$ represents the maximum value of the first phase modulation wave $D_{ad}$, the second phase modulation wave $D_{bd}$ and the third phase modulation wave $D_{cd}$ in the down-shifted three-phase modulation wave, $D_{dmin}$ represents the minimum value of the first phase modulation wave $D_{ad}$, the second phase modulation wave $D_{bd}$ and the third phase modulation wave $D_{cd}$ in the down-shifted three-phase modulation wave.

Figure 7:
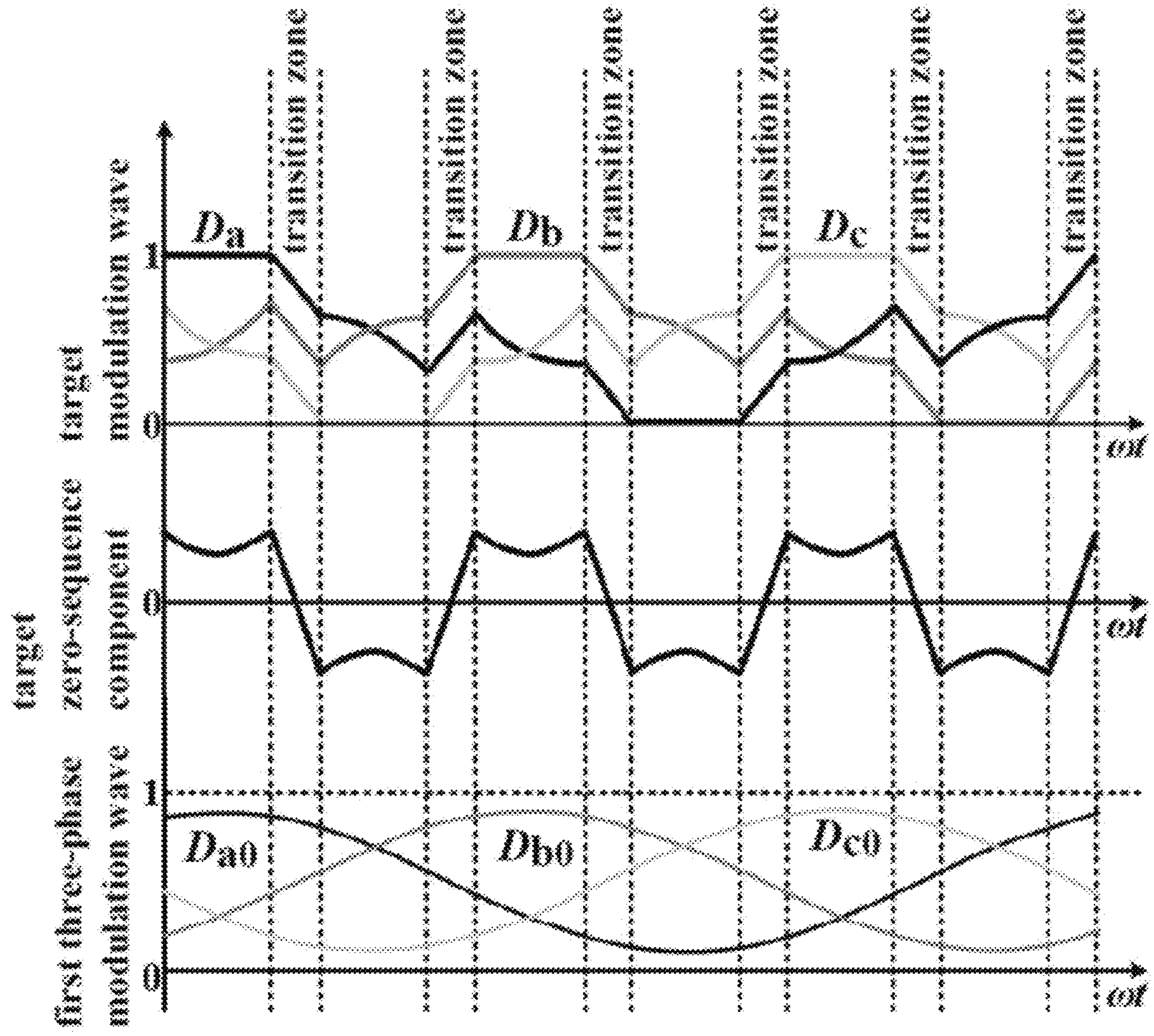
FIG. 7 is a schematic diagram of a target three-phase modulation wave, a target zero-sequence component and a first three-phase modulation wave.

The target zero-sequence component is added into the first three-phase modulation wave, so as to obtain the target three-phase modulation wave (also known as the modulation wave of DPWM), and the target three-phase modulation wave and the target zero-sequence component are schematically shown in FIG. 7. The expression of the target three-phase modulation wave ($D_a$, $D_b$, $D_c$) is as follows.

$$\begin{cases} D_a = D_{a0} + D_0 \\ D_b = D_{b0} + D_0; \\ D_c = D_{c0} + D_0 \end{cases}$$

Where, $D_{a0}$, $D_{b0}$ and $D_{c0}$ denote the first three-phase modulation wave, and Do represents the target zero-sequence component.

Figure 8:
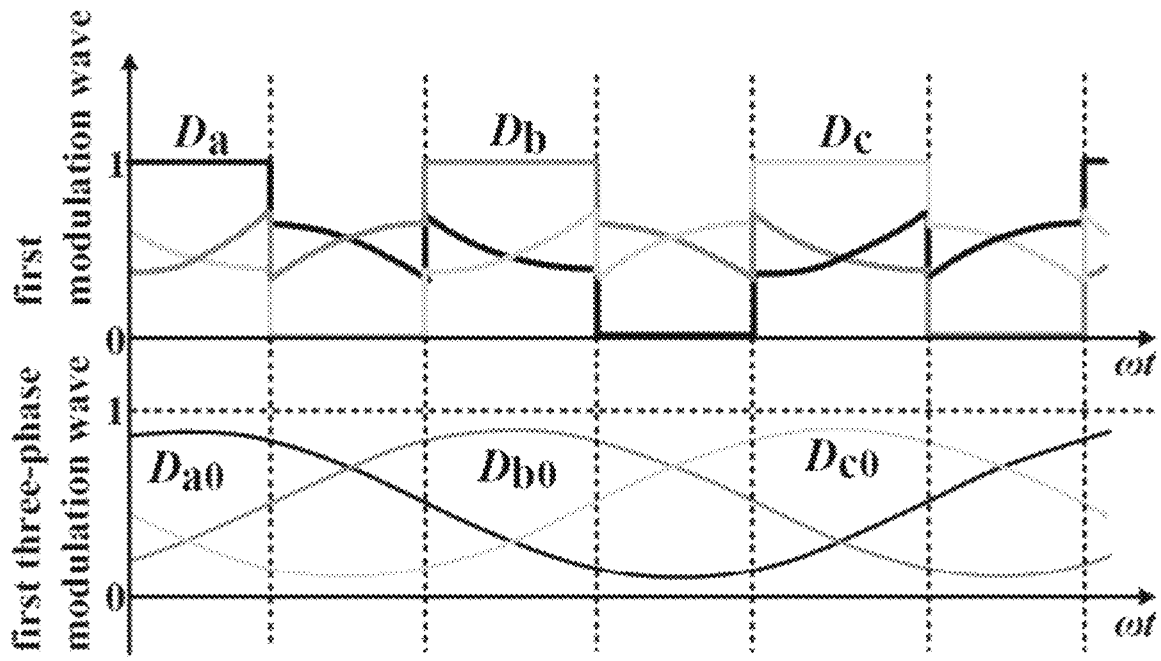
FIG. 8 is a schematic diagram of a modulation wave of a traditional DPWM modulation strategy.
Figure 9:
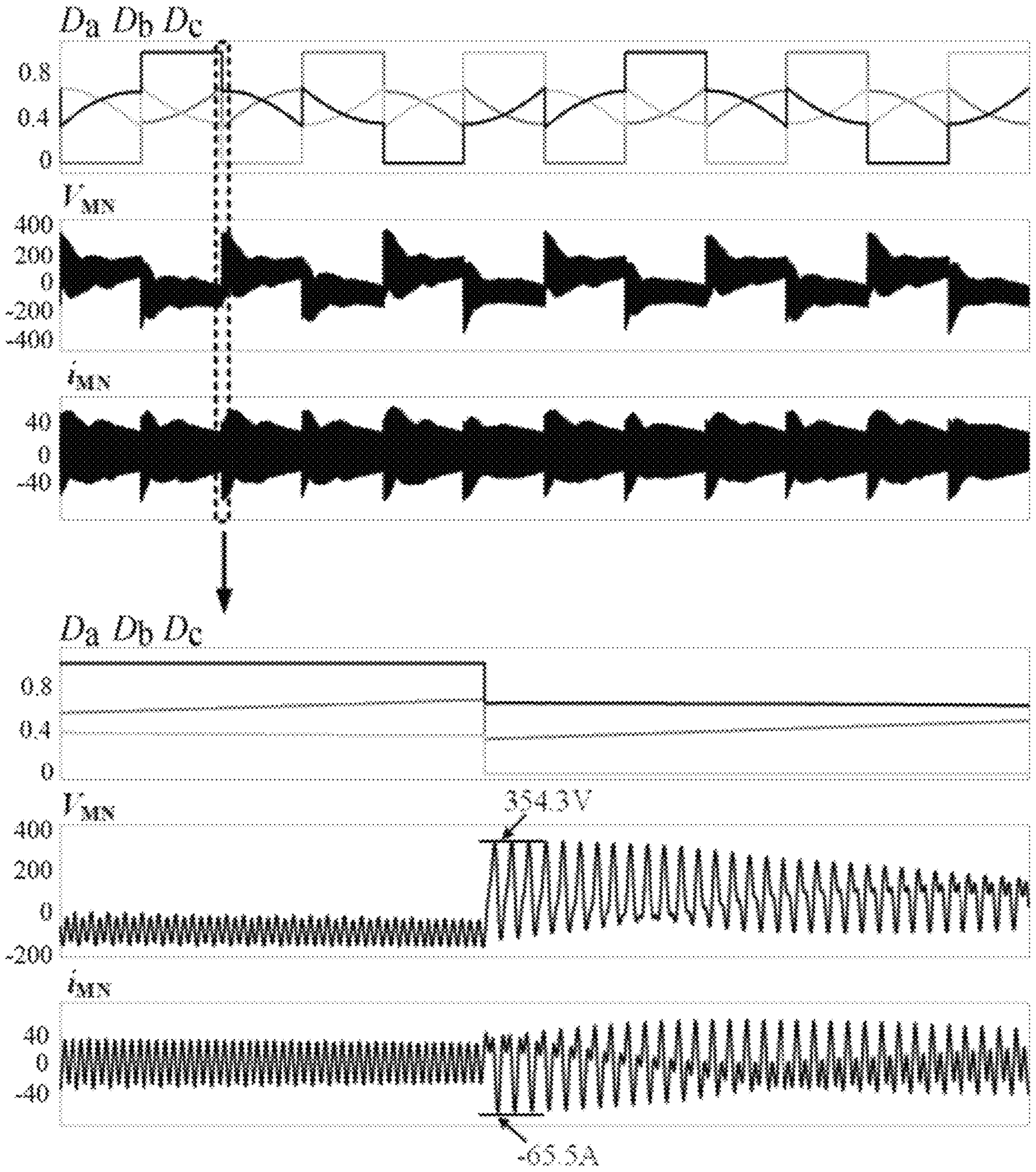
FIG. 9 shows a simulation result of a traditional DPWM modulation strategy.

Taking a three-phase voltage source rectifier with a common-mode suppressor circuit as an example, in order to make analysis easy, the analysis is conducted on a common-mode suppressor unit composed by a single capacitive element. A modulation wave for a traditional six-sector DPWM modulation strategy is shown in FIG. 8, where the power switch tube is clamped (switch-off or switch-on) at the phase voltage with the largest absolute value. When the sectors alternate, in the case of adopting the traditional six-sector DPWM modulation strategy, obvious oscillation occurs to the voltage at both ends of the common-mode suppressor unit and the current via the ends, and raises the voltage and current stress of the capacitor of the common-mode suppressor unit. FIG. 9 shows a simulation result of a traditional six-sector DPWM modulation strategy.

Figure 10:
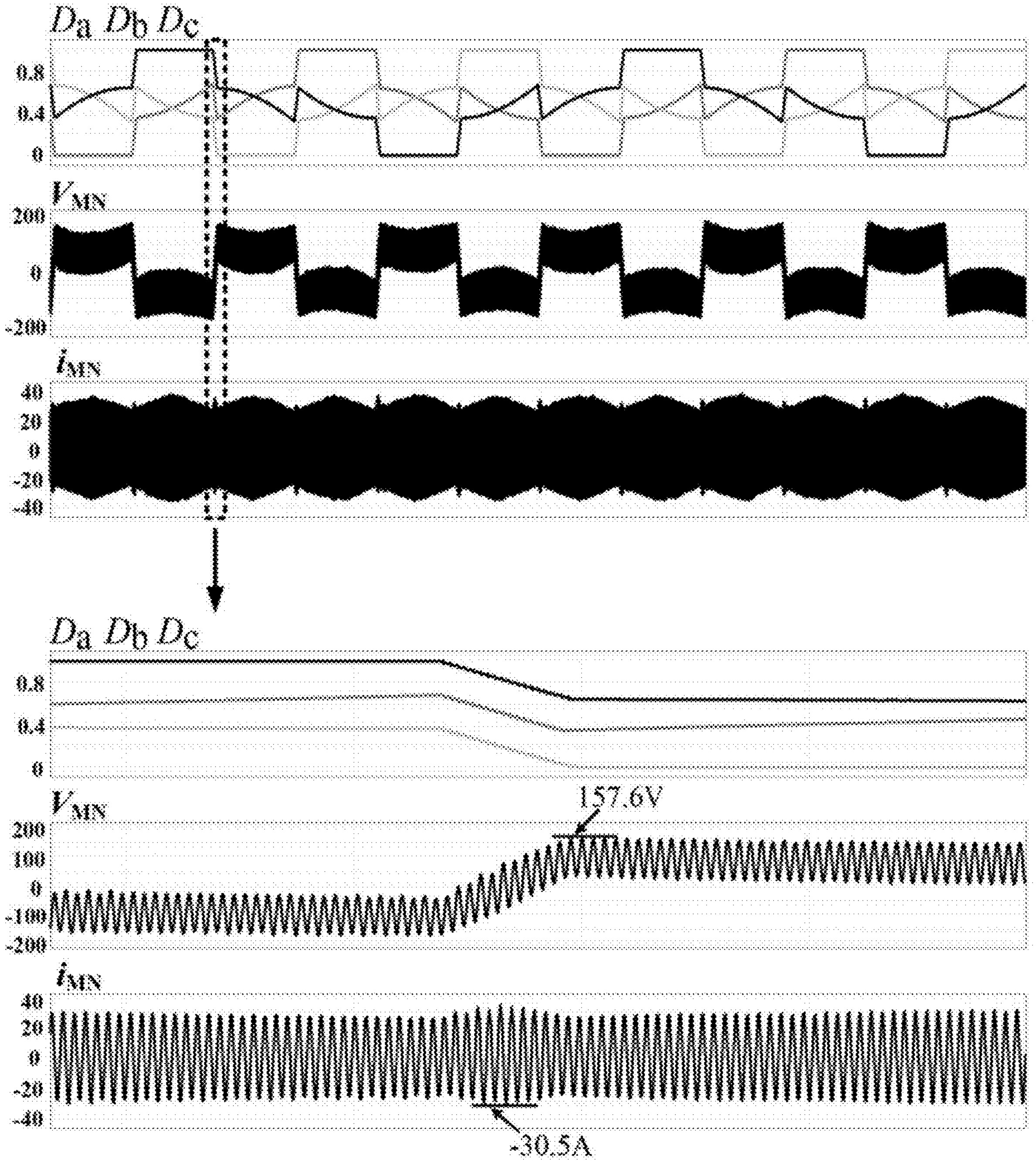
FIG. 10 shows a simulation result of the modulation strategy at m=0.3275, h=0.00437 in the present invention.
Figure 11:
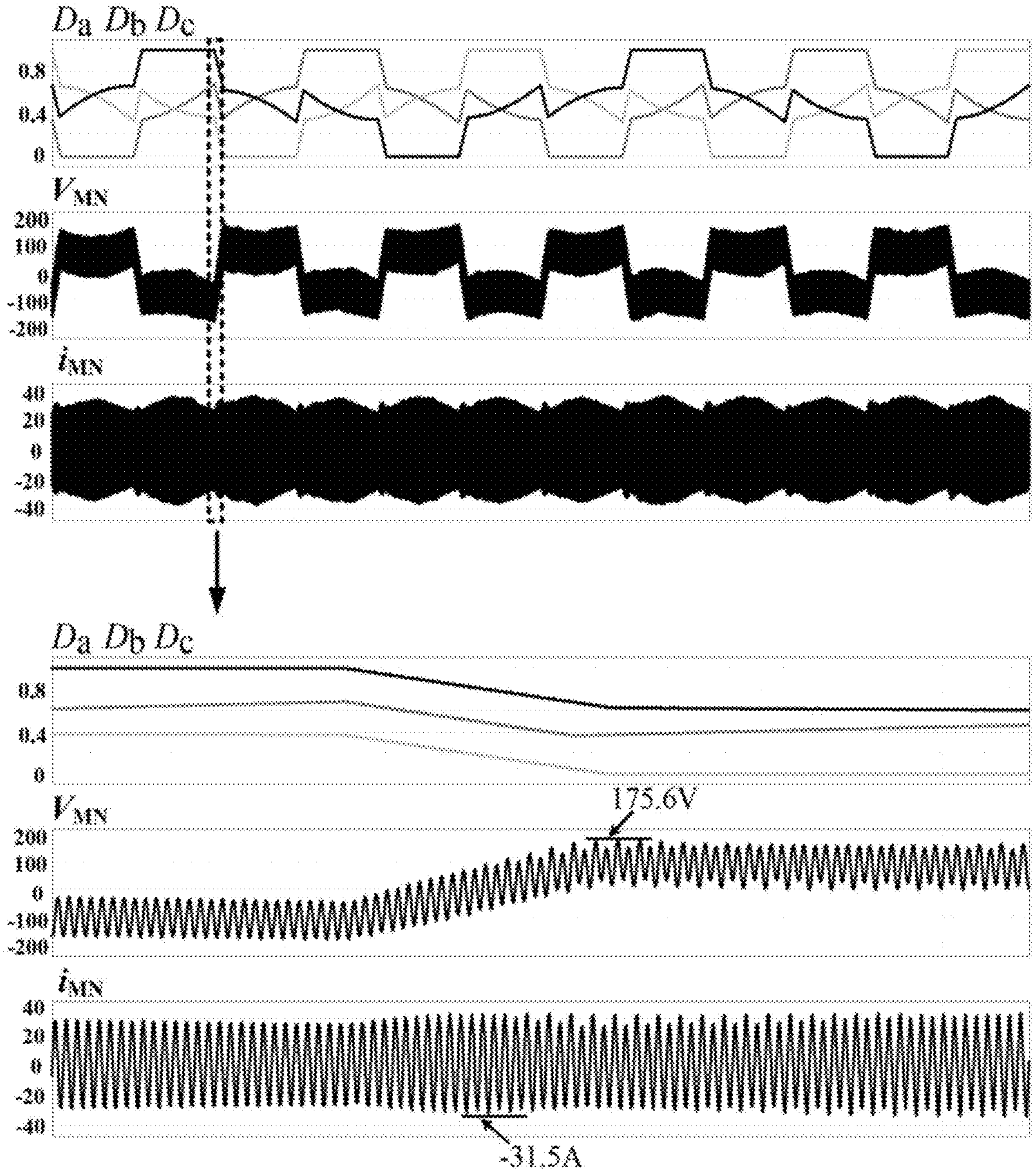
FIG. 11 shows a simulation result of the modulation strategy at m=0.3275, h=0.00874 in the present invention.

FIG. 10 shows a simulation result of the modulation strategy at m=0.3275, h=0.00437 in the present invention. FIG. 11 shows a simulation result of the modulation strategy at m=0.3275, h=0.00874 in the present invention. It can be seen from the two figures that it is possible to eliminate the oscillation occurring to the voltage and current of the common-mode suppressor unit, and greatly abate the voltage and current stress of the capacitance of the suppressor unit, by adopting the discontinuous pulse width modulation strategy proposed by the present invention. In addition, different h values have different suppressor effects on the common-mode voltage and current; the smaller the h value, the better the suppressor effect, but it is noticeable that the value is not supposed to be so small as to make the step amplitude of modulation waves too big, and the peak values of common-mode voltage and current in FIG. 10 are smaller than those in FIG. 11.

The discontinuous pulse width modulation strategy proposed in the present invention provides a method for calculating the zero-sequence component. In the present invention, by way of defining the transition interval and setting the target zero-sequence component in the non-transition interval as the first zero-sequence component, the target first zero-sequence component within the transition interval is calculated out based on the first zero-sequence component, the start time-point of the transition interval and the time-point of sign switching occurring to the first zero-sequence component, thus it is possible to slow down a change rate of a modulation wave within the transition interval, effectively abate the voltage and current oscillation of the common-mode suppressor unit and decrease the stress of the common-mode suppressor unit device; in addition, it is possible to directly calculate out the target zero-sequence component of the transition interval based on a simple and accessible calculation formula. A decrease in the common-mode current further reduces the current of the power element in the three-phase converter, thus abating the loss of the three-phase converter and improving the efficiency of the three-phase converter.

The above examples are only illustrative, not restrictive. Any equivalent modifications or changes made thereto not deviating from the essence and scope of this application shall fall within the scope of the claims of this application.

What is claimed is:

1. A discontinuous pulse width modulation method applied to a three-phase converter, comprising the steps of
- shifting an obtained first three-phase modulation wave upwards to obtain an upward-shifted three-phase modulation wave, and shifting said first three-phase modulation wave downwards to obtain a down-shifted three-phase modulation wave;
- obtaining an upward-shifted zero-sequence component based on said upward-shifted three-phase modulation wave, and obtaining a down-shifted zero-sequence component based on said down-shifted three-phase modulation wave;
- obtaining a start time-point of a transition interval based on said upward-shifted zero-sequence component and said down-shifted zero-sequence component;
- obtaining a target zero-sequence component within said transition interval based on an obtained first zero-sequence component, said start time-point and a time-point of sign switching occurring to said first zero-sequence component;
- obtaining an end time-point of said transition interval based on said first zero-sequence component, said target zero-sequence component within said transition interval and a preset difference threshold; said transition interval being an interval between said start time-point of said transition interval and said end time-point of said transition interval; said start time-point of said transition interval being prior to said end time-point of said transition interval; and
- adding said first three-phase modulation wave and said target zero-sequence component together to obtain a target three-phase modulation wave, and said target zero-sequence component within a non-transition interval being said first zero-sequence component.

2. The discontinuous pulse width modulation method according to claim 1, wherein the step of obtaining a start time-point of a transition interval based on said upward-shifted zero-sequence component and said down-shifted zero-sequence component includes:
- starting said transition interval once it is judged that said upward-shifted zero-sequence component is bigger than 0 and said down-shifted zero-sequence component is smaller than 0.

3. The discontinuous pulse width modulation method according to claim 2, wherein the condition of starting said transition interval is as follows, $$(D_{zd(\alpha)} < 0)\ \&\ (D_{zr(\alpha)} > 0)$$

where, $D_{zr(\alpha)}$ represents a real-time value of said upward-shifted zero-sequence component, $D_{zd(\alpha)}$ represents a real-time value of said down-shifted zero-sequence component.

4. The discontinuous pulse width modulation method according to claim 1, wherein the step of obtaining a target zero-sequence component within said transition interval based on an obtained first zero-sequence component, said start time-point and a time-point of sign switching occurring to said first zero-sequence component includes:

$$D_0 = \begin{cases} \dfrac{-D_{z0(trs1)}}{D_{z0(trs2)} - D_{z0(trs1)}} D_{z0(\alpha)} + \dfrac{D_{z0(\alpha)}}{|D_{z0(\alpha)}|} * \dfrac{D_{z0(trs2)} * D_{z0(trs1)}}{D_{z0(trs2)} - D_{z0(trs1)}} & \text{(transition interval)} \\ D_{z0(\alpha)} & \text{(non-transition interval)} \end{cases}$$

where, $D_0$ represents said target zero-sequence component, $D_{z0(trs1)}$ represents a value of said first zero-sequence component at the beginning of said transition interval, $D_{z0(trs2)}$ represents a value of said first zero-sequence component at a time-point prior to its sign switching position, $D_{z0(\alpha)}$ represents a real-time value of said first zero-sequence component.

5. The discontinuous pulse width modulation method according to claim 1, wherein the step of obtaining an end time-point of said transition interval based on said first zero-sequence component, said target zero-sequence component within said transition interval and a preset difference threshold includes:
- calculating out a difference value of zero-sequence components between said first zero-sequence component and said target zero-sequence component within said transition interval;
- ending said transition interval in the case that an absolute value of the difference value of zero-sequence components is smaller than or equal to said preset difference threshold.

6. The discontinuous pulse width modulation method according to claim 5, wherein the condition of the end time-point of said transition interval is as follows, $$|D_{0(\alpha)} - D_{z0(\alpha)}| \le x$$

where, $D_{0\ (\alpha)}$ represents a real-time value of said target zero-sequence component, $D_{z0\ (\alpha)}$ represents a real-time value of said first zero-sequence component, x represents the preset difference threshold.

7. The discontinuous pulse width modulation method according to claim 1, wherein said first three-phase modulation wave is denoted by the following formulas, $$\begin{cases} D_{a0} = b + m\sin\alpha \\ D_{b0} = b + m\sin(\alpha - 2\pi/3) \\ D_{c0} = b + m\sin(\alpha + 2\pi/3) \end{cases}$$

where, $D_{a0}$ presents the first phase modulation wave of said first three-phase modulation wave, $D_{b0}$ presents the second phase modulation wave of said first three-phase modulation wave, $D_{c0}$ presents the third phase modulation wave of said first three-phase modulation wave, b represents a DC offset, m represents a modulation degree, α=ωt, ω represents a three-phase AC angular frequency.

8. The discontinuous pulse width modulation method according to claim 1, wherein said first zero sequence component is denoted by the following formula, $$D_{z0} = \begin{cases} 0.5 + b - D_{0max} & (|D_{0max}| \geq |D_{0min}|) \\ -0.5 + b - D_{0min} & (|D_{0max}| < |D_{0min}|) \end{cases}$$

where, $D_{z0}$ represents said first zero-sequence component, b represents a DC offset, $D_{0max}$ represents the maximum value of the first phase modulation wave, the second phase modulation wave and the third phase modulation wave in said first three-phase modulation wave, $D_{0min}$ represents the minimum value of the first phase modulation wave, the second phase modulation wave and the third phase modulation wave in said first three-phase modulation wave.

9. The discontinuous pulse width modulation method according to claim 1, wherein said upward-shifted three-phase modulation wave is denoted by the following formulas, $$\begin{cases} D_{ar} = D_{a0} + h \\ D_{br} = D_{b0} + h \\ D_{cr} = D_{c0} + h \end{cases}$$

where, $D_{ar}$ presents the first phase upward-shifted modulation wave of said upward-shifted three-phase modulation wave, $D_{br}$ presents the second phase upward-shifted modulation wave of said upward-shifted three-phase modulation wave, $D_{cr}$ presents the third phase upward-shifted modulation wave of said upward-shifted three-phase modulation wave, $D_{a0}$ presents the first phase modulation wave of said first three-phase modulation wave, $D_{b0}$ presents the second phase modulation wave of said first three-phase modulation wave, $D_{c0}$ presents the third phase modulation wave of said first three-phase modulation wave, h represents an offset;

said upward-shifted zero-sequence component is denoted by the following formula, $$D_{zr} = \begin{cases} 0.5 + b - D_{rmax} & (|D_{rmax}| \geq |D_{rmin}|) \\ -0.5 + b - D_{rmin} & (|D_{rmax}| < |D_{rmin}|) \end{cases}$$

where, b represents a DC offset, $D_{rmax}$ represents the maximum value of the first phase modulation wave, the second phase modulation wave and the third phase modulation wave in said upward-shifted three-phase modulation wave, $D_{rmin}$ represents the minimum value of the first phase modulation wave, the second phase modulation wave and the third phase modulation wave in said upward-shifted three-phase modulation wave.

10. The discontinuous pulse width modulation method according to claim 1, wherein said down-shifted three-phase modulation wave is denoted by the following formulas, $$\begin{cases} D_{ad} = D_{a0} - h \\ D_{bd} = D_{b0} - h \\ D_{cd} = D_{c0} - h \end{cases}$$

where, $D_{ad}$ presents the first phase down-shifted modulation wave of said down-shifted three-phase modulation wave, $D_{bd}$ presents the second phase down-shifted modulation wave of said down-shifted three-phase modulation wave, $D_{cd}$ presents the third phase down-shifted modulation wave of said down-shifted three-phase modulation wave, $D_{a0}$ presents the first phase modulation wave of said first three-phase modulation wave, $D_{b0}$ presents the second phase modulation wave of said first three-phase modulation wave, $D_{c0}$ presents the third phase modulation wave of said first three-phase modulation wave, h represents an offset;

said down-shifted zero-sequence component is denoted by the following formula, $$D_{zd} = \begin{cases} 0.5 + b - D_{dmax} & (|D_{dmax}| \geq |D_{dmax}|) \\ -0.5 + b - D_{dmax} & (|D_{dmax}| < |D_{dmax}|) \end{cases}$$

where, b represents a DC offset, $D_{dmax}$ represents the maximum value of the first phase modulation wave, the second phase modulation wave and the third phase modulation wave in said down-shifted three-phase modulation wave, $D_{dmin}$ represents the minimum value of the first phase modulation wave, the second phase modulation wave and the third phase modulation wave in said down-shifted three-phase modulation wave.

* * * * *